United States Patent [19]

Taverna

[11] 4,408,686
[45] Oct. 11, 1983

[54] APPARATUS FOR TRANSFERRING ARTICLES FROM ONE CONVEYING LINE TO ANOTHER CONVEYING LINE WHOSE DIRECTIONS ARE ANGULARLY SPACED

[75] Inventor: Andrea Taverna, Florence, Italy

[73] Assignee: Gabbrielli Impianti di Gabbrielli Franco & C.s.a.s., Florence, Italy

[21] Appl. No.: 237,798

[22] Filed: Feb. 24, 1981

[30] Foreign Application Priority Data

Mar. 6, 1980 [IT] Italy ................................. 9374 A/80

[51] Int. Cl.³ ...................... B65G 47/26; B65G 47/24
[52] U.S. Cl. .................................... 198/433; 198/480; 198/488
[58] Field of Search ................................. 198/412–413, 198/457, 433, 426, 480, 487–490, 951; 414/607, 732, 738, 910

[56] References Cited

U.S. PATENT DOCUMENTS 2,392,523  1/1946  Cramer ........................... 198/426 X
2,525,132 10/1950  Herts et al. ..................... 198/412 X
3,934,705  1/1976  Balch et al. ........................ 198/433
4,064,016 12/1977  Vortmann ....................... 198/488 X Primary Examiner—Robert C. Watson
Assistant Examiner—Douglas D. Watts
Attorney, Agent, or Firm—Ladas & Parry

[57] ABSTRACT

An apparatus for transferring objects from one conveying line to another conveying line, the directions of the two lines being angularly displaced, comprising a body which is capable of rotating around a fixed central shaft, which in rotation carries conveying arms capable of a reciprocating angular movement around an axis which is orthogonal to their longitudinal axis, said arms being connected to said rotating body through supporting means caused to rotate with equal speed but, in opposite direction, to that of rotation of said rotating body, in order to keep said arms constantly parallel with respect to each other during rotation of said rotating body 8 Claims, 4 Drawing Figures

APPARATUS FOR TRANSFERRING ARTICLES FROM ONE CONVEYING LINE TO ANOTHER CONVEYING LINE WHOSE DIRECTIONS ARE ANGULARLY SPACED

BACKGROUND OF THE INVENTION

This invention relates to an apparatus for transferring articles from one conveying line to another conveying line the directions of which form an angle and in particular an angle between 0° and 180°.

So far, in order to get rows of articles in a production line to mechanically accomplish an angular displacement, conveying devices were used which formed a curve of a required angle at the correct point. However such systems have shown considerable drawbacks mainly arising from the excessive dimensions of the conveying device, and from the necessity to have to vary appropriately the feed rate of the articles in order to allow them to mutually move away from each other upon curving and then gradually come close again in the subsequent straight part of the conveying line.

It is the object of this invention to provide an apparatus for transferring one or more articles coming from a certain direction to another direction angularly spaced from the first, and more particularly for changing a row arrangement into a formation arrangement on parallel lines and vice versa.

SUMMARY OF THE INVENTION

According to the invention, an apparatus for transferring articles from one conveying line to another angularly spaced conveying line comprises a rotating body mounted on a central shaft fixed to a support frame, at least a conveyor arm extending from a face of said body and placed eccentrically with respect to said central shaft, an articulated joint connection between said rotating body and said conveyor arm, for transmitting to it, upon a complete rotation of said rotating body, a reciprocating rotatory motion around an axis orthogonal to the longitudinal axis of said arm in correspondence to an end thereof, support means of said conveyor arm pivotally connected with said end, carried by said rotating body, caused to rotate in turn, with equal speed but in the opposite direction of said body around an axis orthogonal to said face, said reciprocating rotatory motion occurring therefore on a plane that constantly keeps parallel to itself, during the rotation of said rotating body.

BRIEF DESCRIPTION OF THE DRAWING

The apparatus according to the invention will be further described, by way of example, with reference to the accompanying drawings, which illustrate a preferred embodiment.

In the drawings.

DETAILED DESCRIPTION OF THE PREFERRED EMBODIMENT

Figure 1:
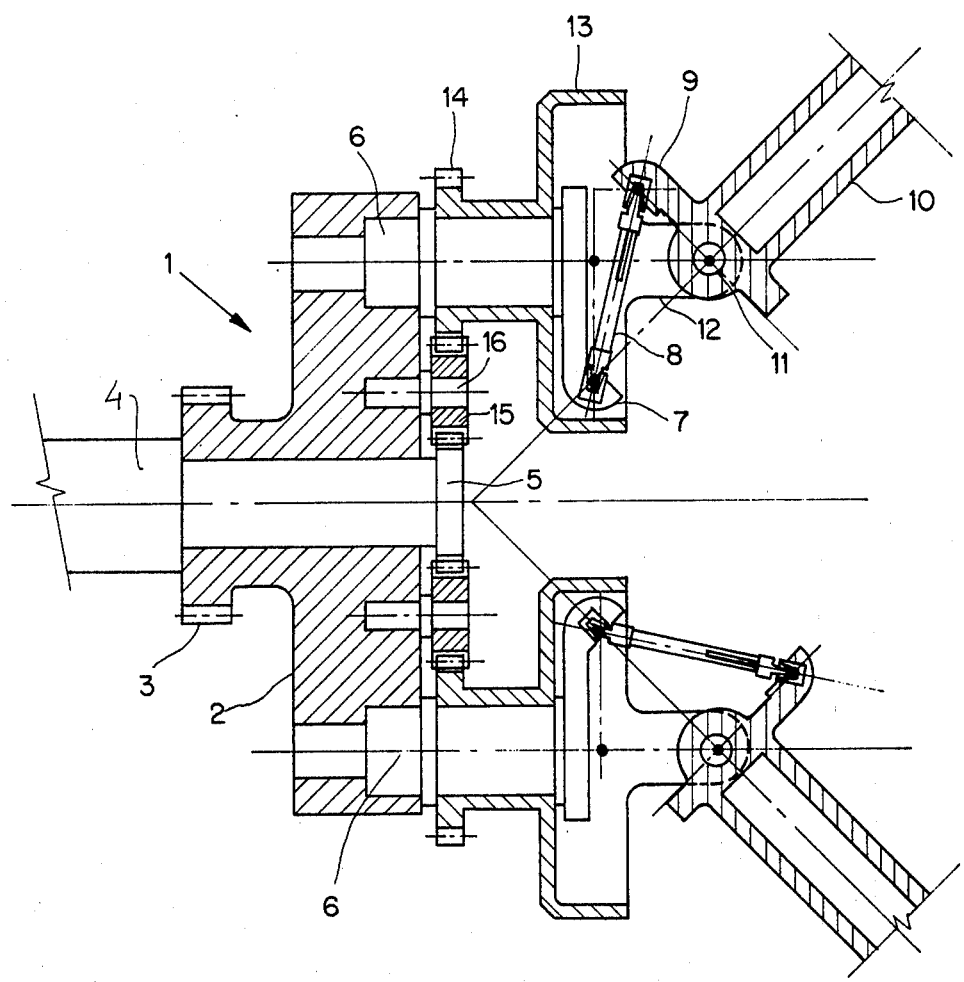
FIG. 1 is a cross section view of the embodiment according to the invention, parts being broken away for ease of understanding.

Referring to FIG. 1, the numeral 1 generally designates a rotating body, comprising two opposite expansions 2, said body being axially integral with a rear gear 3 for coupling to a motor (not shown). Rotating body 1 is mounted to rotate on a central shaft 4, integral with a supporting frame (not shown), the end of shaft 4 also carries a dove tail mounted gear 5.

On expansions 2 of rotating body 1, two fixed shafts 6 are mounted in symmetrically opposed position with respect to the axis of rotating body 1 itself, the front end of each of said shafts 6 presenting an appendix 7 which extends radially, the free end of which forms the seat of a first cardan articulation or universal joint on a free end of connecting bar 8, the other end of which presents a second cardan articulation axially pivotable and revolving with respect to the first. The second cardan articulation or universal joint is placed in a respective seat formed on one end of an appendix 9 externally extending from the elongation of the base block of a conveying arm 10, from the free end of which appropriate means extend (not shown in FIG. 1) adapted to perform initial feeding, movement during translation and final storage of the objects to be transferred, the conformation of said means depending on the nature of said objects.

Said base block of arm 10 has its fulcrum in coincidence with a point which lies on an extension of the axis of the latter, on a pivot pin 11, which is integral, in coincidence with its ends, with two supporting extensions, of which only one is shown and indicated in 12, which extend in one single piece in positions diametrically opposed from the free edge of the enlarged portion of a sleeve 13, essentially in the shape of a bell, the minor diameter portion of which is pivotally supported on its respective fixed shaft 6 and is integral in coincidence with its free end with a gear 14 adapted to engage with an intermediate gear 15 in engagement with gear 5 integral with central shaft 4, said intermediate gear 15 being pivotally supported on shaft 16 fixed to rotating body 1. The gears 5, 15 and 14 form a planetary gear train.

Figure 2A:
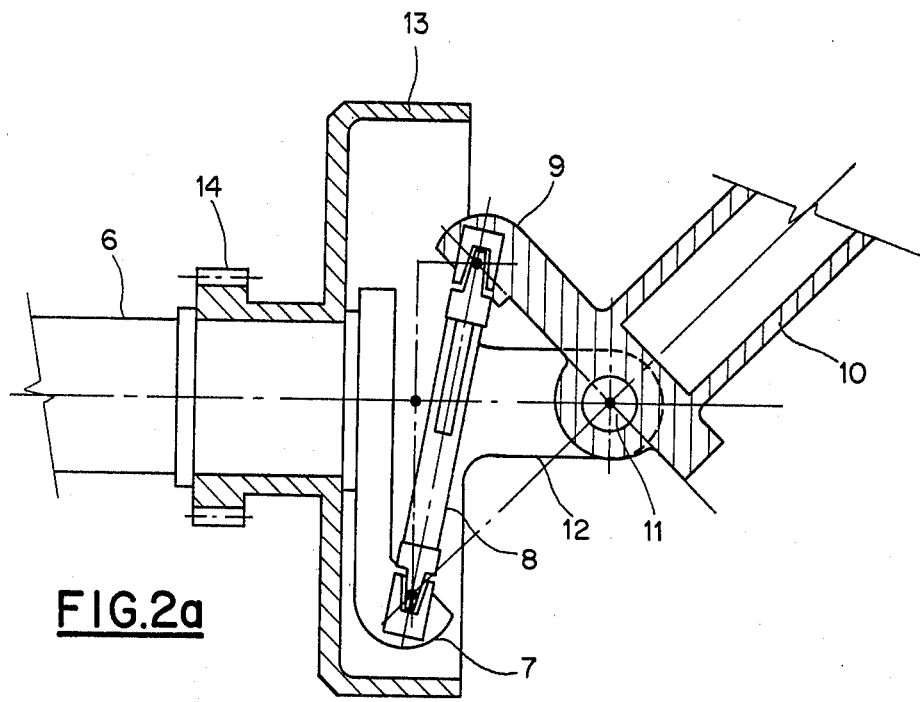
FIGS. 2a and 2b are cross section views of a conveyor arm and related mechanisms, of the apparatus according to FIG. 1 in a starting position (feeding station) and in a destination position (storing or discharging station)
Figure 2B:
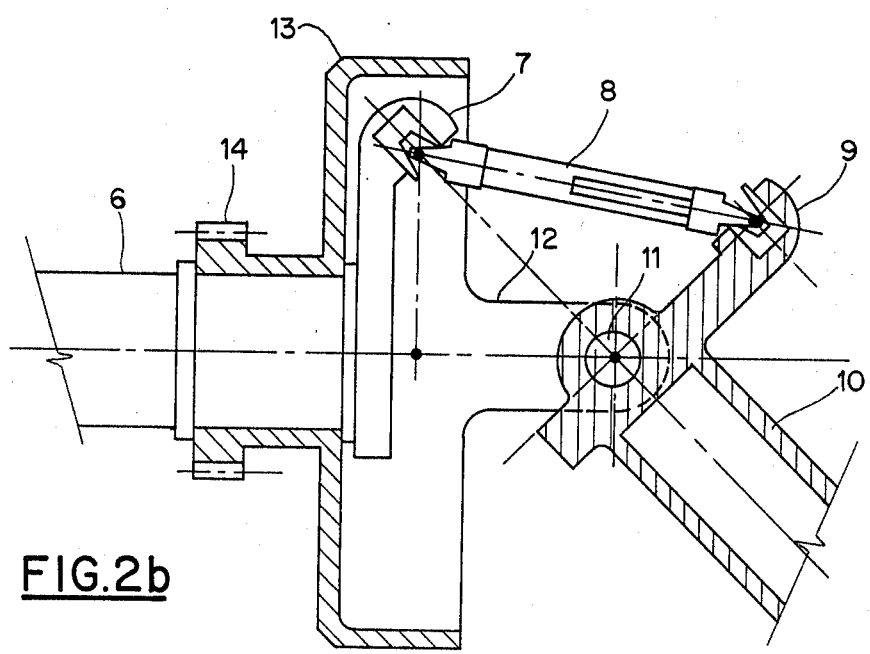

With particular reference to FIGS. 2a and 2b, operation of the apparatus according to the invention concerning for the time being, for ease of description, the movement of only one of the two conveying arms, i.e. the one indicated in 10 in FIG. 1 will now be shown as moving from the starting position (FIG. 2a) to its final position (FIG. 2b).

In the first of said positions the axis of arm 10, as seen from FIG. 2a, forms an angle of 45° upwards with respect to the axis of shaft 6 appendix 7 of which is facing downwards with connecting bar 8 of the first and second cardan articulation in a retracted position. As the apparatus is started body 1 is caused to rotate through gear 3 (see FIG. 1) connected through appropriate gearing to a driving motor (not shown). Following said rotation gear 5, through intermediate gear 15 in engagement with gear 14, will cause the bell-shaped sleeve 13 to rotate in a direction opposite to that of body 1. After a rotation of 180° of body 1, and a consequent rotation by the same angle of shaft 6, appendix 7 of the latter will be in a diametrically opposed position with respect to the starting position (see FIG. 2b) thus causing, due to the appropriate geometry of the couplings, a rotation of 90° towards the outside of appendix 9 and therefore a rotation by the same angle around pivot 11 of arm 10 which will appear to be oriented as seen in FIG. 2b so as to form an angle of 45° with its own axis downwards with respect to the axis of shaft 6. At the same time, bell-shaped sleeve 13 by performing a rotation around shaft 6 maintains perpendicularity of its own extensions 12 and of pivot 11 constant during the whole arc of rotation by 180° of body 1, thus preventing avoid an overturning or, at any rate, a sideways inclination of arm 10 pivoted at 90° with respect to pivot 11 thus keeping it, in other words, constantly on a plane parallel to the starting plane during its rotation by 90° in space, so as to avoid loss of taken objects during transferring.

Figure 3:
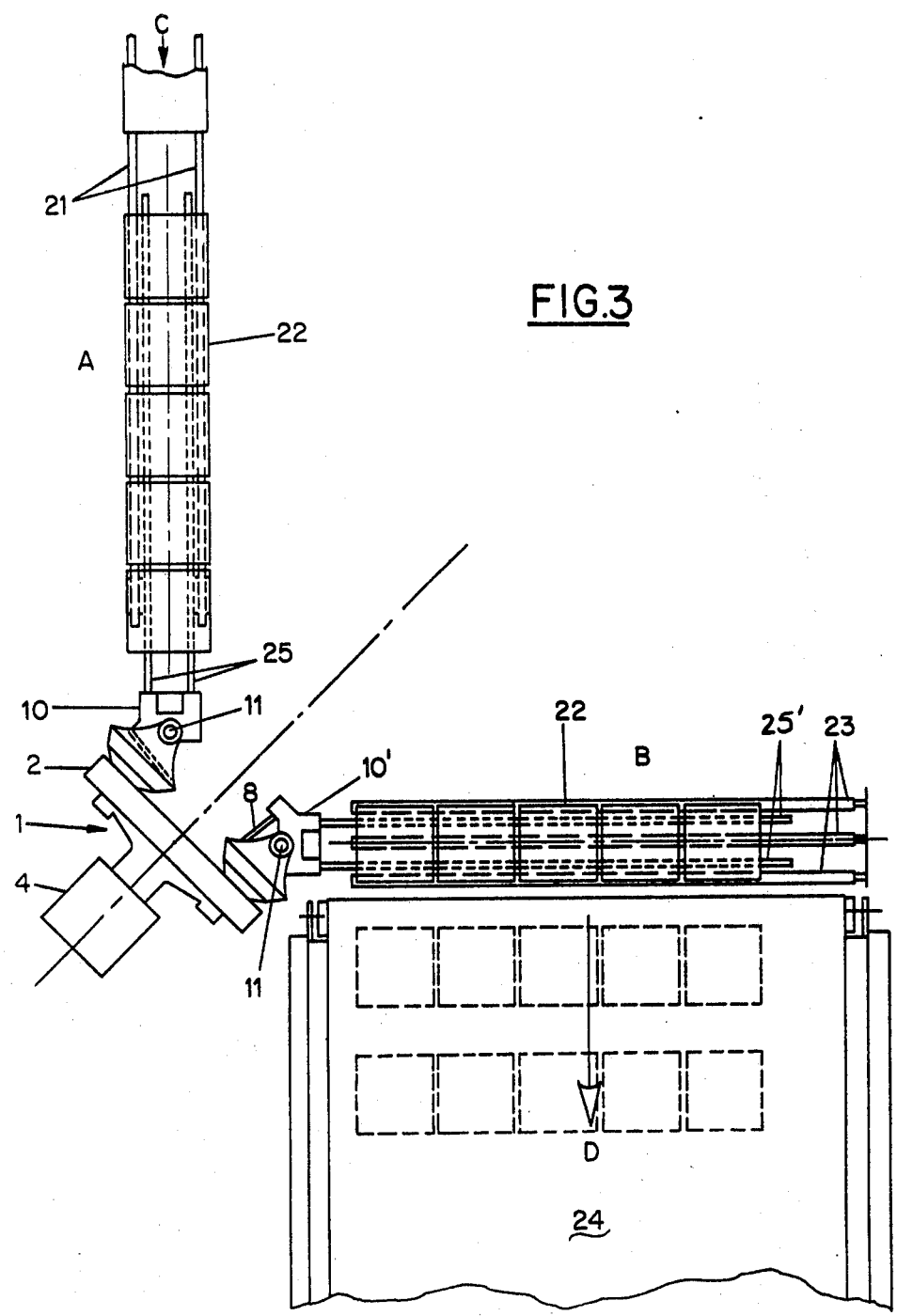
FIG. 3 is a schematic plan view of the apparatus according to this invention particularly as applied to a tile production line.

With reference to FIG. 3, a particularly useful application of the apparatus according to the invention is shown, as placed on a ceramic tile production line and more exactly at the point of said line in which tiles ready for baking are transferred from a row formation to a group formation on parallel lines which feed into a single layer oven or which feed to an intermediate stocking system.

From the foregoing it can be seen how it is necessary to collect a preset number of tiles from the row of incoming tiles, cause said tiles to be moved angularly by 90° and deliver them according to a line which is perpendicular to the direction of movement of a conveyor belt for further processing, said grouping on parallel lines being formed in later processing cycles.

The apparatus according to the invention solves the aforementioned problem.

In FIG. 3 the feeding station of the tiles is indicated at A and comprises a conveyor belt 21 equipped with trapezoidal belts, on which in a continuous manner in the direction indicated by arrow C, tiles 22 are conveyed one after the other coming from previous process steps, while B indicates the station of a later feeding step comprising a certain number of rollers 23 mounted on different planes and in continuous rotation placed parallelly with respect to the front edge of a conveyor belt 24, on which tiles 2 are to be positioned in group form on parallel lines and caused to advance in the direction shown by arrow E for being fed into the ovens or delivered to intermediate stocking stations.

As can be viewed from FIG. 3 the center lines of stations A and B forms an angle of 90° between them, so that in order to obtain transfer of tiles 22 from the row form in station A to the group form in station B it is necessary to cause said row to rotate by 90°.

To this end the apparatus according to the invention is placed with the axis of central shaft 4 on the bisecting line of said angle between stations A and B so that arm 10 will be oriented towards the axis of station A and the other arm, indicated at 10', will be facing the axis of station B.

It should be noted here that the length of connecting bar 8 and appendixes 7 and 9 is such to cause, after a rotation of 180° of body 1, an angular movement of 90° of the associated arm 10 with respect to the axis of shaft 6.

It should further be noted that, in the case described herein, the means adapted to feed, support during movement and release of the objects to be transferred, outlined in this specification, are formed by two coplanar flat rods 25, appropriately spaced, extending from the free end of each arm 10, 10' in a parallel relation with respect to their axis.

With the apparatus according to the invention in the aforesaid position, before the machine is started rods 25 of arm 10 will be placed between the two belts of conveyor 21 just below the upper plane of said belts, while rods 25' of arm 10' will be in the spaces between the rollers mounted on different planes which is intermediate with respect to those mounted externally.

Once the apparatus is started, during rotation up to 180° of body 1 an initial movement is determined from the bottom up of arm 10, rods 25 picking up the desired number of tiles 22, along with an angular movement of arm 10 in the space towards the top of the sheet depicting FIG. 3, till it reaches 90° from the starting position, while arm 10' performs the same movement in space towards the bottom of the sheet depicting FIG. 3, that is to say arm 10 moves from the feeding station A of the tiles to the next processing station B, while arm 10' moves from B to A. During said angular movement, the simultaneous rotation of bell shaped arm 13 in a direction opposite to that of rotating body 1, keeps arm 10 constantly on a plane which is parallel to the starting plane thus keeping picked-up tiles 22 from falling. As rotation of body 1 progresses in a continuous manner, arm 10 moved to B also continues to rotate in the manner described above towards the bottom of the sheet depicting FIG. 3 its direction being towards A and its related rods 25 by passing through rollers 23 mounted on different planes, will place tiles 22 on said rollers which rotating in the appropriate sense will ensure placing said tiles on conveyor belt 24 in a group form, while arm 10' moved to A picks up another group of tiles 22 to transfer them in the above mentioned manner to B and form a second group parallel to the first on conveyor belt 24 and so on.

Although in this preferred embodiment of the apparatus according to the invention so far described the axis of the arms form an angle of 90° between them, it is obvious that such angle, and more in general the angle between the starting line and the arriving line, may be any angle between 0° and 180°. This may be achieved by simply changing the geometry of the system formed by appendixes 7 and 9 and connecting bar 8, as well as the position of pivot 11. For example if needs of the production line require that the two arms 10 and 10' perform a rotation which is less than 90°, it would be sufficient to reduce the length of appendix 7 keeping the arrangement and dimensions of the other elements unchanged, with respect to the basic configuration and to those dimensions which allow a rotation of 90°. Of course the same result may be obtained by moving pivot 11 along the axis of fixed shaft 7 in a direction closer to bell shaped sleeve 13, keeping the length of the other elements unchanged. It can also be arranged that the angle between the axis of one arm 10 and the axis of the corresponding fixed shaft 6 in the starting position (that is at the station where objects are picked up) be different from the angle formed by the same axis in the arriving position of the arm (that is at the station where objects are forwarded onto further processing steps). This can be simply obtained by placing rotation pivot 11 on arm 10 in an off-line position with respect to the axis of fixed shaft 6. For example, with reference to FIG. 2a, by moving pivot 11 downwards, still leaving the dimensions of the other elements unchanged (which implies therefore also bringing pivot 11 closer to bell-shaped sleeve 13) a system is obtained wherein the angle between the axis of arm 10 and the axis of fixed shaft 6 is smaller in the starting position than that of arm 10 in the arriving position.

Variations and or modifications may be brought to the apparatus according to the invention as substantially described herein and illustrated in the drawings without departing from the field and scope of the invention itself.

I claim:

1. An apparatus for transferring objects from one conveying line to another conveying line, the directions of which form an angle between 0° and 180° with respect to one another, the apparatus comprising:
    a shaft fixed in space with respect to the conveying lines;
    a rotating body rotatively mounted on the shaft;
    drive means usable for causing the rotating body to rotate on the shaft;
    pivot means rotatively fixed to the rotating body;
    a conveying arm pivoted with respect to the rotating body for picking up articles on one of the conveyers and transferring them to the other of the conveyers;
    support means connected to the rotating body for pivotally supporting the conveying arm with respect to the rotating body;
    a planetary gear train interposed between the shaft and the support means, the planetary gear train being driven by relative rotation of the rotating body and the shaft, the planetary gear train being configured to rotate the support means at a speed equal to but in a rotational direction opposite to the rotating body; and
    an articulated connection between the pivot means and the conveying arm for causing spatial movement of the conveying arm necessary to transfer the objects from a first of the conveyor lines to a second conveyor line.

2. The apparatus according to claim 1 wherein said articulated connection comprises a fixed shaft extending orthogonally from a face of the rotating body in the vicinity of its perimetrical edge and having, in coincidence with its free end, a first appendix on a free terminal part thereof on which a first seat is formed for a first universal joint connected with one end of a connecting bar, the other end of the connecting bar being provided with a second universal joint adapted to be placed in a corresponding second seat formed on a second appendix extending radially from the end of said conveying arm, the conveying arm being pivoted on said supporting means in a relation of orthogonality with respect to said fixed shaft.

3. The apparatus according to claim 1 wherein said supporting means comprise a sleeve ending in the shape of a bell pivotally supported on said fixed shaft, having two extensions diametrically opposed extending parallelly from the perimetrical edge of the bell-shaped part at the ends of which a pivot is fixed and on which said end of the conveying arm is pivotally mounted.

4. The apparatus according to claim 1, wherein said conveying arm is provided with loading and unloading means for picking up, in a feeding station, one or more objects coming from a first conveying line in a first arrangement and for dropping said objects on a second conveying line, in a further processing station, and in a second arrangement.

5. The apparatus according to claim 1, wherein said rotating body is provided with two equal conveying arms placed on diametrically opposite sides and equidistant with respect to said central shaft.

6. The apparatus according to claim 1 in which the articulated connection comprises:
    a connecting bar for being connected to the pivot means at a first end and an appendix of the conveying arm at a second end;
    a first universal joint at the first end connecting the connecting bar to the pivot means; and
    a second universal joint at the second end connecting the connecting bar to the appendix of the conveying arm.

7. The apparatus according to claim 1 in which the pivot means is pivoted on an axis perpendicular to a plane defined by the longitudinal axis of the conveying arm and of the shaft.

8. The apparatus according to claim 1 in which the planetary gear train comprises a first gear in engagement with the support means and with a second intermediate gear carried by said rotating body, the second gear being engaged with a third gear keyed on the shaft, the first gear rotating at the same speed, but in the opposite direction around its own axis with respect to the rotating body.

* * * * *